May 14, 1935.   H. E. JOHNSON   2,001,138
SEALING MEANS
Filed Sept. 11, 1931    2 Sheets-Sheet 1
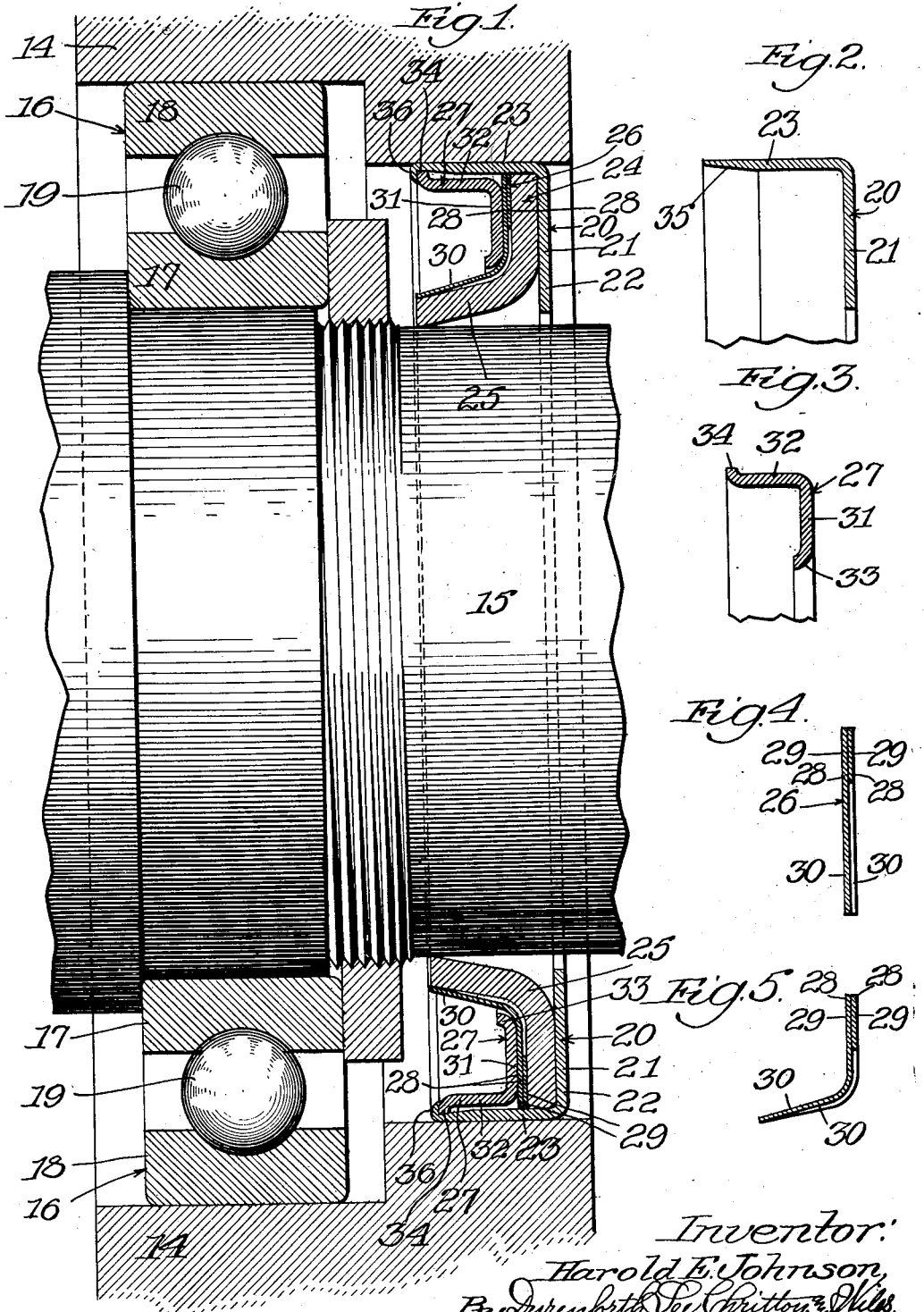
Inventor:
Harold E. Johnson,
By Dyrenforth, Lee, Chritton & Wiles,
Attys.

May 14, 1935.                    H. E. JOHNSON                    2,001,138
                                  SEALING MEANS
                              Filed Sept. 11, 1931            2 Sheets-Sheet 2
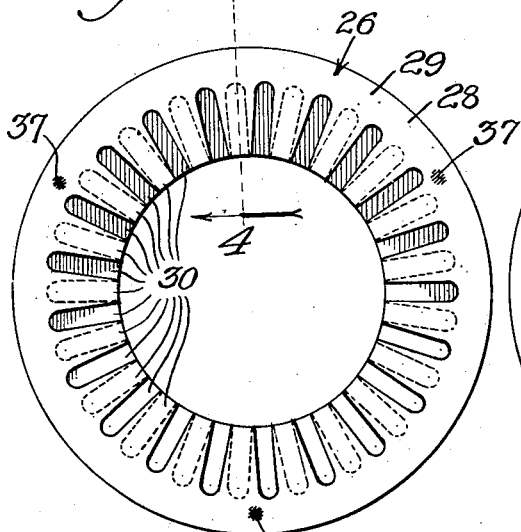
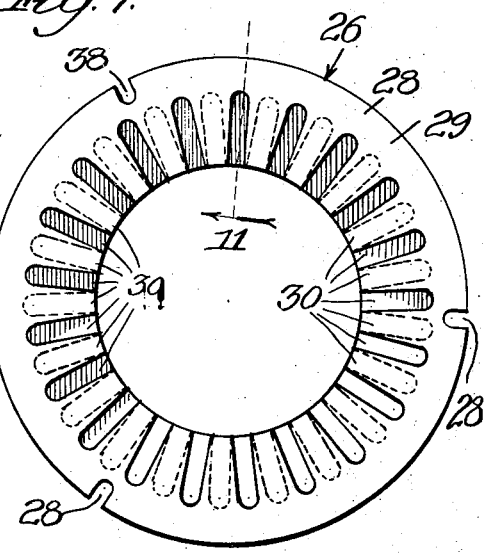
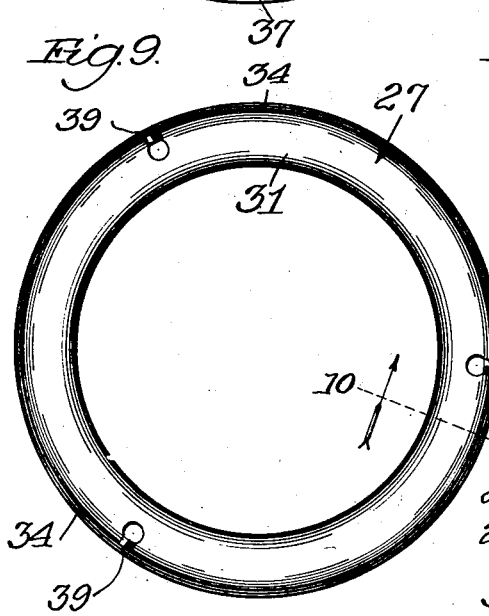
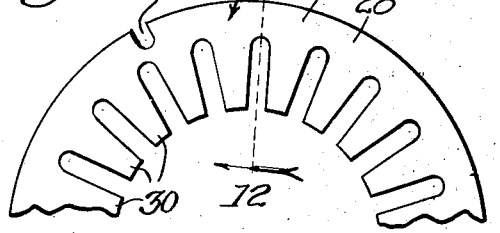
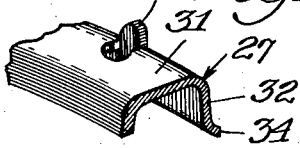
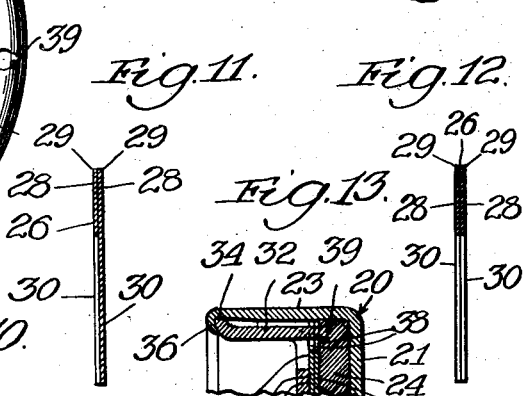
Inventor:
Harold E. Johnson, Patented May 14, 1935

2,001,138

UNITED STATES PATENT OFFICE 2,001,138

SEALING MEANS

Harold E. Johnson, Evanston, Ill., assignor to Chicago Rawhide Manufacturing Company, Chicago, Ill., a corporation of Illinois Application September 11, 1931, Serial No. 562,377

7 Claims. (Cl. 288—1)

My invention relates to oil or grease seals or retainers for use in connection with rotatable shafts to prevent the lubricating oil or grease from escaping along the rotating shafts and also to prevent the ingress of dirt, dust and other foreign matter to the housings in which the bearings for the shafts are located and which would damage the bearings, the seals being applicable to installations in general involving rotating shafts, such as for example axle shafts of automobiles and revolving shafts protruding from transmissions, gear boxes, etc.

My objects are to provide a seal for the general purpose above referred to, which will not require manual adjustment after installation, but will be self-adjusting to maintain a perfect seal in the continued operation of the shaft in connection with which it is used; to provide a simple and economical construction of seal; to provide a construction of seal which normally will not require replacement; to provide a construction of seal which will provide and maintain a perfect seal even though the shaft may be eccentric relative to the bearing housing; to provide a construction of sealing means whereby in the assembling of the parts thereof no danger of buckling of the device, distorting it for accurate fit in the location in which it is to be used, will occur; and generally to improve on sealing means as hitherto provided.

Referring to the accompanying drawings:

Figure 1 is a broken view in longitudinal sectional elevation of a shaft and bearing assembly equipped with my improved sealing means.

Figure 2 is a broken fragmentary sectional view of a retainer, in the form of a cup, forming an element of my improved sealing means.

Figure 3 is a similar view of a ring-shaped cover member constituting another part of the sealing means.

Figure 4 is a cross-sectional view through the plural disk spring tongue-equipped device forming still another part of the sealing means, this device being shown in normal condition unassembled with any of the other parts of the sealing means, the section being taken at the line 4 on Fig. 6 and viewed in the direction of the arrow.

Figure 5 is a view like Fig. 4 of the construction shown therein, the tongues of the device being shown in the position assumed by them when the sealing means are in use.

Figure 6 is a face view of the spring tongue-equipped device formed of separate disk members illustrating one way in which the disk members may be secured against relative displacement.

Figure 7 is a similar view showing another means for holding the disk members against relative displacement, both Figs. 6 and 7 showing an arrangement of the disks in which the tongues are disposed in staggered relationship.

Figure 8 is a broken view of an arrangement of the spring tongue equipped disks in which the tongues of the disks are coincident.

Figure 9 is a face view of a modified form of cover arrangement for use with the spring tongue structure of Figs. 7 or 8.

Figure 10 is a broken section taken at the line 10 on Fig. 9 and viewed in the direction of the arrow.

Figure 11 is an enlarged section taken at the line 11 on Fig. 7 and viewed in the direction of the arrow.

Fig. 12 is an enlarged section taken at the line 12 on Fig. 8 and viewed in the direction of the arrow; and Fig. 13, a fragmentary sectional view of a sealing means assembly comprising, as parts thereof, the parts shown in Figs. 7, 9 and 10.

Referring to Figs. 1 to 6 inclusive of the drawings, 14 represents a bearing housing which, by way of example, may be the bearing housing of an automobile shaft, and 15 a rotating shaft, as for example the rotating axle of an automobile, there being interposed between the shaft 15 and the bearing housing, ball bearings 16 comprising inner and outer race-ways 17 and 18, respectively, and a series of balls 19 interposed therebetween.

The structure above described is equipped with sealing means in accordance with my invention for preventing the escape of the fluid lubricant from the bearing housing 14 along the shaft toward its outer end, namely to the right in Fig. 1, and to prevent the ingress of dirt, dust and other foreign matter to the bearing housing.

The sealing means referred to comprise a cage, or retainer, 20 of annular cup form which surrounds the shaft 15 and is positioned in the bearing housing 14 in sealed engagement with the latter, the cage 20 comprising a ring 21 of angular shape in cross-section, affording a ring section 22 disposed normal to the axis of the shaft 15 and an annular flange section 23 extending from the circumferential margin of the section 22 and concentric with the shaft 15.

Located in the cage 20 is an annular ring-like packing member 24 of rawhide, leather, or other suitable packing material, which fits flatwise at its outer marginal portion against the inner face of the ring 21, its inner annular marginal portion being deflected, as represented at 25, the member 24 snugly embracing the shaft 15 at the outer marginal edge of the deflected portion 25 as shown.

The packing member 24 is sealed within the cage 20 and held constantly in close, sealing, engagement at its portion 25 with the shaft 15 by a spring member 26 and a cover member 27.

According to the particular construction shown the spring member 26 is formed of a plurality of flatwise-opposed disk-like members 28 each presenting a solid outer ring portion 29 from the inner edge of which a circular series of spring tongues 30, integral with the ring portion 29 radiate, the spring member 26 fitting flatwise against the inner surface of the ring 24 as shown and conformingly fitting at its tongues 30, in the flexed condition shown in Figs. 1 and 5, against the outer surface of the flange-portion 25 of the packing ring 24, these tongues thus surrounding the flange-portion 25 and under their spring tension urging the flange-portion 25 in close embracing and sealing engagement with the shaft 15.

The spring member 26 may be provided in any of several forms. It may be provided as a single disk member with an inner series of tongues as described of each disk 28, or it may be made of a plurality of disks such as 28 each provided with a series of tongues as 30, the disk members 28 being so relatively disposed that the tongues of the respective disk members extend in staggered relation to each other as shown in Figs. 1, 4, 5, 6, 7 and 11, or coincident with each other as shown in Figs. 8 and 13. In all of these forms it is preferred that the spring members, in normal condition, be flat as shown in Figs. 4, 6, 7 and 11, and in the assembling of the parts of the seal the tongues of the disk members are deflected in the pressing of the member 26 into assembled condition with the packing member 24 in which condition the tongues 30 are deflected radially outwardly and thus press against the surface of the portion 25 of the packing 24 which they oppose causing the portion 25 to snugly embrace the shaft 15, the flange portion 25 of the packing member 24 engaging the shaft 15 circumferentially under tension at the extreme end of the flange portion 25, thereby forming a permanent and self-adjusting seal at the point of contact of the packing member with the shaft.

In the case of the use of a single tongue-equipped disk 28 forming the member 26, the tongues 30 will conformingly fit the outer surface of the flange portion 25 of the packing member 24, but only at spaced apart areas around the portion 25, and while a single disk may, under certain conditions operate satisfactorily, it is preferred that a plurality of the disks 28 be employed with their tongues 30 staggered as above stated and shown and that the widths of the tongues 30 and the spaces therebetween be such that when the assembly is installed for use the outer extremities of the tongues 30 on the one of the disks 28 nearest the packing member 24 enter the spaces between the tongues 30 of the other disk and thus all of the tongues of both disks will conformably fit, under tension, the surface of the packing member 24 which they oppose.

The cover member 27 which clamps the spring member 26 against the packing ring 24 and the latter, in turn, against the ring portion 21 of the cage 20, is of angle shape in cross-section presenting a ring portion 31 at which the cover member is adapted to press against the face of the spring member 26, and an annular flange portion 32, the inner edge of the ring portion 31 being rounded as represented at 33 and the outer edge of the flange 32 being radially outwardly deflected as represented at 34, to provide a rim to the member 27 of larger diameter than the diameter of this member at the part 32. The member 27, in assembling it with the cup 20, contacts at its portion 34 with the inner surface of the annular flange 23 which latter is preferably beveled as indicated at 35, but is spaced at its portion 32 from this flange. Thus in the securing together of the several parts forming the sealing means by spinning or crimping the outer edge of the flange 23 around the outer edge of the flange 32, as represented at 36, any tendency to outward buckling of the flange 32 will not, owing to the spacing of these parts, produce outward buckling of the flange 23 and thus buckling of the flange 23 is avoided.

It is desirable that the disks 29, when a plurality thereof are provided, be held against relative rotation out of the position in which the tongues 30 occupy the desired position whether staggered or coincident.

In Fig. 6 I have illustrated one desirable way of accomplishing this result and comprising the spot welding of the disks together as for example at the places indicated at 37, these means being applicable whether the tongues 30 are staggered as shown or are coincident.

In Figs. 7 to 13 inclusive, I have illustrated another way of preventing the rotational displacement of the disks relative to each other and comprising openings 38 formed in the peripheral edges of the disks 28 and equally spaced the same distance on each disk and so disposed that when the disks are positioned flatwise together with certain faces thereof opposed the tongues 30 will be staggered relative to each other as shown in Figs. 7 and 11, and when one disk is reversed to cause its opposite face to oppose the other disk the tongues will be coincident as shown in Figs. 8 and 12.

In this construction the ring portion 31 is provided with lugs 39 projecting outwardly therefrom and positioned to extend into the registering openings 38 in the disks 28 and with which the lugs 39 register.

While I have illustrated and described certain constructions constituting embodiments of my invention, I do not wish to be understood as intending to limit it thereto as the invention may be embodied in other forms of structure without departing from the spirit of the invention.

What I claim as new, and desire to secure by Letters Patent, is:

1. In a seal, the combination of a packing ring having a flange at its central portion for encircling an element at which the seal is to be effected, a member having spring tongues disposed around said flange and operating by their spring tension to constrict said flange about said element, and means for holding said ring and member in assembled condition, said member being formed of a plurality of flatwise opposed disks from the inner edges of the rims of which the said tongues extend, said disks presenting disk-positioning portions so disposed that when said disks are placed flatwise together with certain faces thereof in opposed relation and said disk-positioning portions are in registration, respectively, the tongues on said disks will be coincident and when one of said disks is placed with its other face in opposed relation to the other disk and the disk-positioning portions are in registration, respectively, the tongues on one disk will be staggered relative to the tongues on the other disk.

2. In a seal, the combination of a packing ring having a flange at its central portion for encircling an element at which the seal is to be effected, a member having spring tongues disposed around said flange and operating by their spring tension to constrict said flange about said element, and means for holding said ring and member in assembled condition, said member being formed of a plurality of flatwise opposed disks from the inner edges of the rims of which the said tongues extend, said disks presenting disk-positioning openings so disposed that when said disks are placed flatwise together with certain faces thereof in opposed relation and said disk-positioning openings are in registration, respectively, the tongues on said disks will be coincident and when one of said disks is placed with its other face in opposed relation to the other disk and said openings are in registration, respectively, the tongues on one disk will be staggered relative to the tongues on the other disk.

3. In a seal, the combination of a packing ring having a flange at its central portion for encircling an element at which the seal is to be effected, a member having spring tongues disposed around said flange and operating by their spring tension to constrict said flange about said element, and means for holding said ring and member in assembled condition comprising a portion bearing against said member, said member being formed of a plurality of flatwise opposed disks from the inner edges of the rims of which said tongues extend, said portion being provided with spaced apart projections disposed opposite said member, and said disks having disk-positioning openings into which said projections extend.

4. In a seal, the combination of a packing ring having a flange at its central portion for encircling an element at which the seal is to be effected, a member having spring tongues disposed around said flange and operating by their spring tension to constrict said flange about said element, and means for holding said ring and member in assembled condition, comprising a portion bearing at a face thereof against said member, said member being formed of a plurality of flatwise opposed disks from the inner edges of the rims of which the said tongues extend, said portion being provided at the face thereof at which it bears against said member with spaced apart projections and said disks having disk-positioning openings into which said projections extend.

5. In a seal, the combination of a packing ring having a flange at its central portion for encircling an element at which the seal is to be effected, a member having spring tongues disposed around said flange and operating by their spring tension to constrict said flange about said element, and means for holding said ring and member in assembled condition comprising a portion bearing at a face thereof against said member, said member being formed of a plurality of flatwise opposed disks from the inner edges of the rims of which the said tongues extend, said portion being provided at the face thereof at which it bears against said member, with spaced apart projections and said disks having disk-positioning openings into which said projections extend, said openings being so disposed that when said disks are placed flatwise together with certain faces thereof in opposed relation and said openings are in registration, respectively, the tongues on said disks will be coincident and when one of said disks is placed with its other face in opposed relation to the other disk and said openings are in registration, respectively, the tongues on one disk will be staggered relative to the tongues on the other disk.

6. A self-contained sealing unit comprising a cup-shaped sheet metal holder, a flanged packing ring positioned against the bottom of the holder with the flange so arranged as to seal against a rotating shaft passing through the holder, a thin sheet metal spring ring positioned against the packing ring and provided with a large number of closely arranged tongues in spring-pressed engagement with said flange, a single sheet metal closure ring positioned under pressure against the tongues of the spring ring, with the tongue-engaging portion of the closure ring located in a plane which is spaced axially a substantial distance from both the edge of the rim of the holder and the edge of the flange of the packing ring, and an inturned locking flange on the edge of the rim of the holder having clamped engagement with a radially extending flange on the closure ring, said closure ring being spaced inwardly from the rim of the holder at all points except at the edge of the holder.

7. In a seal, a packing ring having an axially extending tubular flange portion for engagement with a rotating shaft, a spring ring positioned against the packing ring and provided with a plurality of tongues in spring-pressed association with said flange portion, and a two-part sheet metal casing in which both said rings are mounted; said casing consisting of a centrally apertured cup against both the bottom and rim of which the packing ring is positioned, and a centrally apertured closure plate which is clamped against the spring ring and is provided with a tubular portion which is spaced from the rim of the cup and extends axially from the spring rim to a point opposite the edge of the rim of the cup, and a flange portion which is formed integrally with the tubular portion and extends outwardly from the tubular portion into closely fitting axially interlocked abutment with the rim of the cup at the edge only of the latter, the rim of the cup where engaged by said flange portion being of reduced thickness on the inside, and said reduced portion being spun over the edge of the flange portion.

HAROLD E. JOHNSON.

CERTIFICATE OF CORRECTION.

Patent No. 2,001,138.             May 14, 1935.

HAROLD E. JOHNSON.

It is hereby certified that error appears in the printed specification of the above numbered patent requiring correction as follows: Page 3, second column, line 53, claim 7, for "rim" read ring; and that the said Letters Patent should be read with this correction therein that the same may conform to the record of the case in the Patent Office.

Signed and sealed this 25th day of June, A. D. 1935.

(Seal)

Bryan M. Battey
Acting Commissioner of Patents.